Oct. 6, 1970 L. B. ROBINSON 3,532,904
CLIPPING CIRCUIT
Filed May 8, 1968
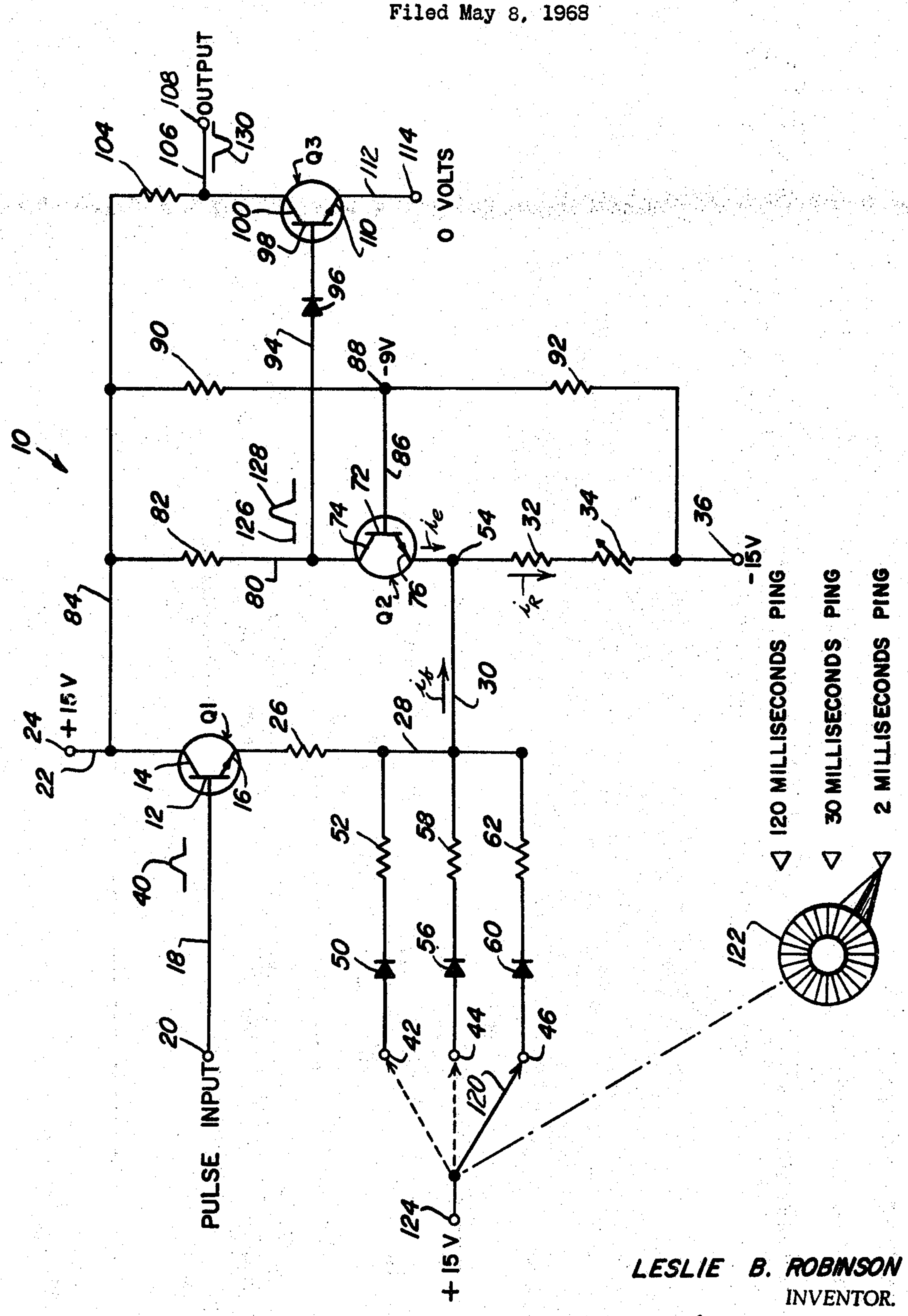
LESLIE B. ROBINSON
INVENTOR.
BY Harvey A. David
John M. Pesce
ATTORNEYS 3,532,904

CLIPPING CIRCUIT

Leslie B. Robinson, Edmonds, Wash., assignor, by mesne assignments, to the United States of America Filed May 8, 1968, Ser. No. 727,538
Int. Cl. H03k 5/08, 5/20
U.S. Cl. 307—264 5 Claims

ABSTRACT OF THE DISCLOSURE

A transistorized variable clipping circuit operable from a source of D.C. potential for providing a half sine wave output pulse, the amplitude of which is dependent upon the amplitude of an input pulse and upon the selected application of a D.C. control voltage.

BACKGROUND OF THE INVENTION

The art of simulation of operational equipments such as sonar, radar, and the like leans heavily on specialized electronic circuits which produce signals having frequency, phase, pulse length, or other characteristics which will cause indicators, scopes, and the like to function in a manner which will resemble functioning of their operational counterparts under actual conditions sought to be simulated. In the instance of simulation of certain sonar equipment which is operable to ping at different selected pulse lengths and provides responses which are meaningfully different to a skilled operator, there has developed a need for a specialized circuit which would be useful in effective and realistic simulation of operation at different ping lengths.

BRIEF SUMMARY OF THE INVENTION

With the foregoing in mind, it is a primary object of this invention to provide a novel variable clipping circuit which is capable of providing a different modifying action on an input pulse in accordance with each of a plurality of control conditions which, in one example of use, represent ping lengths.

Another object of the invention is the provision of a simple yet reliable transistorized circuit for providing a variable clipping action on an input pulse of half sine wave configuration to provide an output pulse the amplitude and width of which is determined by selected application of a control voltage, the selection being characterized, for example, as 2, 30, or 120 millisecond ping modes selected by the operator of apparatus embodying the circuit.

As another object this invention aims to achieve the foregoing through the provision of a circuit of the aforedescribed character and comprising certain novel combinations and arrangements of parts as will be apparent from the accompanying drawing and detailed description given hereinafter.

BRIEF DESCRIPTION OF THE DRAWING

The invention will be better understood by reference to the accompanying drawing in which the sole figure comprises a schematic illustration of a transistorized, variable clipping circuit embodying the present invention.

DESCRIPTION OF THE PREFERRED EMBODIMENT

In the form of the invention illustrated in the drawing and described hereinafter, there is provided a circuit generally indicated at 10 comprising three transistors Q1, Q2, and Q3 of the NPN type. Each of these transistors may conveniently be of the designation 2N1711.

Transistor Q1 has a base 12, a collector 14, and an emitter 16. The base 12 of transistor Q1 is connected by conductor 18 to an input terminal 20, while the collector 14 is connected by a conductor 22 and terminal 24 to a source of positive D.C. potential of 15 volts. The emitter 16 is connected through a fixed resistor 26, conductors 28 and 30, a fixed resistor 32, and a variable resistor 34 to a source of negative D.C. potential of 15 volts at terminal 36. The transistor Q1 operates as an emitter follower amplifier for input pulses 40 applied via terminal 20 to the base 12 of that transistor.

The circuit may be selectively conditioned to change the clipping action thereof by application of a positive 15 volt D.C. control signal to terminal 42, 44, or 46 in a manner and for a purpose which will presently be made apparent. Terminal 42 is connected through a diode 50, a resistor 52, and conductors 28 and 30 to a junction 54 between the resistors 26 and 32. Terminal 44 is connected through a diode 56, a resistor 58, and conductor 30 to the junction 54, and terminal 46 is connected through a diode 60, a resistor 62, and conductors 28 and 30 to the junction 54.

The transistor Q2 comprises a base 72, a collector 74, and an emitter 76. The collector is connected to the source of positive 15 volt D.C. potential through conductor 80, a resistor 82, a conductor 84, and terminal 24. The emitter 76 is connected to the junction 54 and is therefore connected through resistors 32 and 34 to the negative 15 volt potential at terminal 36. The base 72 is connected by a conductor 86 to a junction 88 between voltage dividing resistors 90 and 92 which are connected in series between the positive and negative terminals 24 and 36 to provide a fixed bias to the base.

The collector 74 of the transistor Q2 is also connected through a conductor 94 and a diode 96 to the base 98 of the transistor Q3. This transistor Q3 includes a collector 100 connected through a resistor 104 and conductor 84 to the source of positive 15 volt D.C. potential, and is connected by a conductor 106 to an output terminal 108. Transistor Q3 further includes an emitter 110 connected through a conductor 112 to an output terminal 114 which is at a nominal potential of zero volts.

The diodes 50, 56, 60, and 96 are conveniently of the type designated 1N483B and, in the circuit being described by way of example, the mentioned resistors may conveniently be of the ohmic values given in the following table.

| Resistor: | Ohms |
|---|---|
| 26 | 10,000 |
| 32 | 1,500 |
| 34 | 1,000 |
| 52 | 82,000 |
| 58 | 120,000 |
| 62 | 470,000 |
| 82 | 10,000 |
| 90 | 12,000 |
| 92 | 3,000 |
| 106 | 7,500 |

The terminal 42, 44, or 46 to which the previously mention 15 volt control signal is to be applied is, in this example, selected by positioning of a switch 120 by means of a suitably indexed control indicator knob 122 which the trainee uses to select the ping mode which a sonar simulator embodying the invention is to simulate. When the indicator knob is in the illustrated position to select a 2 millisecond ping mode, the switch 120 applies the positive 15 volt control signal from a suitable source connected to a terminal 124 to the input terminal 46.

In operation of the circuit, and when no pulse input is applied to terminal 20, transistor Q1 is substantially non-conducting so that substantially no current flows from the emitter thereof through the resistor 26 and the junction 54. Transistor Q2 and the divided formed by resistors 90 and 92 provide an essentially constant voltage at the emitter 76 of transistor Q2 and hence also at junction 54. This voltage and the value of resistors 32 and 34 determine a constant value of current $i_R$ in resistors 32 and 34. Also, the fixed, positive 15 volt control voltage which is applied to terminal 46, 44, or 42, causes an amount of current to be injected via conductor 30 through junction 54 into resistors 32 and 34. This current is also fixed and constant at a value depending upon the value of resistor 62, 58, or 52. This current will be referred to as the fixed bias current $i_b$ henceforth.

The emitter current $i_e$ in emitter 76 of transistor Q2 is the difference obtained from subtracting the fixed bias current $i_b$ from the total resistor current $i_R$. This difference current $i_e$ is also essentially equal to and determines the collector current in transistor Q2. Thus, the fixed bias current $i_b$ value establishes a quiescent voltage level at the collector 74 of Q2 (collector current multiplied by resistance of resistor 82 and subtracted from plus 15 volts). This quiescent voltage level or base level 126 is adjusted by means of resistor 34 to be at a given level which is negative with respect to zero volts D.C. so that transistor Q3 is biased off when the current is in the quiescent state. Thus, the collector potential of transistor Q3 is normally at positive 15 volts D.C.

Now, if a sinusoidal pulse 40 is applied to the base of transistor Q1 (which operates as a current source or emitter follower into junction 54) the current into junction 54 increases in a sinusoidal fashion and since the voltage at this junction is fixed by divider 90, 92 and transistor Q2, this current from transistor Q1 must further subtract from the Q2 emitter current. Thus, the emitter current $i_e$ and consequently the collector current in transistor Q2 are reduced in a sinusoidal manner. Therefore, the collector voltage at transistor Q2 changes and forms a positive sinusoidal pulse 128. A portion of this pulse may exceed the threshold formed by the base emitter diode of transistor Q3 and diode 96. The amount by which the pulse 128 exceeds this threshold determines the amplitude and width of the output pulse 130 at the collector of transistor Q3.

Thus, since the fixed bias current $i_b$ establishes the base level 126 for pulse 128 and therefore the relationship between this level and the threshold diodes, changing this fixed bias current $i_b$ by switching the control voltage input from terminal 46 to a different terminal such as 44 or 42 changes the amplitude and width of pulses 130 occurring at the collector of transistor Q3.

From the foregoing detailed description it will be appreciated that the previously stated objects and advantages, as well as others evident from the description, have been satisfied by the variable clipping circuit of this invention.

Obviously many modifications and variations of the present invention are possible in the light of the above teachings. It is therefore to be understood that within the scope of the appended claims the invention may be practiced otherwise than as specifically described.

What is claimed is:

1. A clipping circuit for providing output pulses the amplitudes and widths of which are dependent on the amplitudes of input pulses and selected applications of a D.C. control voltage, said circuit comprising:

a first transistor having base, collector and emitter connections, said first transistor being connected to receive said input pulses at the base connection thereof and having its collector connection coupled to a source of direct current at a first potential;

first resistance means connected between junction means and a source of direct current at a second potential which is less than said first potential;

means connecting the emitter connection of said first transistor to said junction means whereby emitter current in said first transistor serves as a source of varying current flow through said first resistance means in response to said input pulses;

a plurality of second resistance means each connected to said junction means;

means for applying a source of direct current control voltage at a potential above that of said junction means to one of said second resistance means so as to cause a predetermined fixed bias current to pass through said second resistance means;

a second transistor having base, collector, and emitter connections, the collector connection of which is connected by third resistance means to said source of first potential, and the emitter connection of which is connected to said junction means as another source of current through said first resistance means;

voltage divider means connected to the base connection of said second transistor whereby the emitter current of the latter seeks a value which will maintain said junction means at a predetermined third potential between said first and second potentials so that the total current through said first resistance means remains constant and the emitter current of said second transistor is the difference between total current flow in said first resistance means and the sum of said fixed bias current and the emitter current of said first transistor;

a third transistor having base, emitter, and collector connections, the collector connection being connected through fourth resistance means to said first potential and said emitter connection being connected to a source of lesser potential;

diode means coupling the collector connection of said second transistor to the base connection of said third transistor whereby changes in voltage at said collector connection of said second transistor as a result of change in emitter current thereof will be applied to the base connection of said third transistor; and said first, second, and third resistance means having values so selected that the collector connection of said second transistor is normally at a predetermined base voltage level below the threshold voltage at which said third transistor will begin to conduct, whereby output pulses at the collector connection of said third transistor represent only a predetermined portion of said input pulses.

2. A clipping circuit as defined in claim 1, and wherein:

said first, second and third transistors are of the NPN type.

3. A clipping circuit as defined in claim 1 and wherein:

said first resistance means includes a variable resistor for calibration adjustment of said base voltage level.

4. A clipping circuit as defined in claim 1 and wherein:

said means for applying a source of direct current control voltage comprises means for alternatively selecting different ones of said second resistance means to establish digerent values for said fixed bias current and hence different values for said base voltage, whereby the portion of said input pulses represented by said output pulses can be selectively varied.

5. A clipping circuit as defined in claim 3 and wherein:

said means for applying a source of direct current control voltage comprises means for alternatively selecting different ones of said second resistance means to establish different values for said fixed bias current and hence different values for said base voltage, whereby the portion of said input pulses represented by said output pulses can be selectively varied.

References Cited

UNITED STATES PATENTS

| | | | |
|---|---|---|---|
| 3,253,133 | 5/1966 | Rabinovici et al. | 307—237 XR |
| 3,302,034 | 1/1967 | Nowell | 307—264 XR |
| 3,317,753 | 5/1967 | Mayhew | 307—235 XR |

JOHN S. HEYMAN, Primary Examiner

J. ZAZWORSKY, Assistant Examiner

U.S. Cl. X.R.

307—235, 237